A. P. BODENSTEIN.
FOOD MOLDER.
APPLICATION FILED JAN. 23, 1911.
996,449.
Patented June 27, 1911.
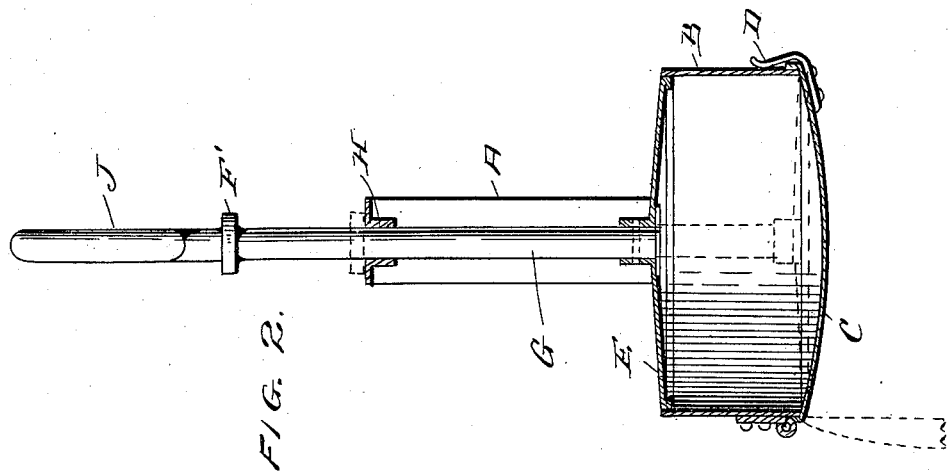
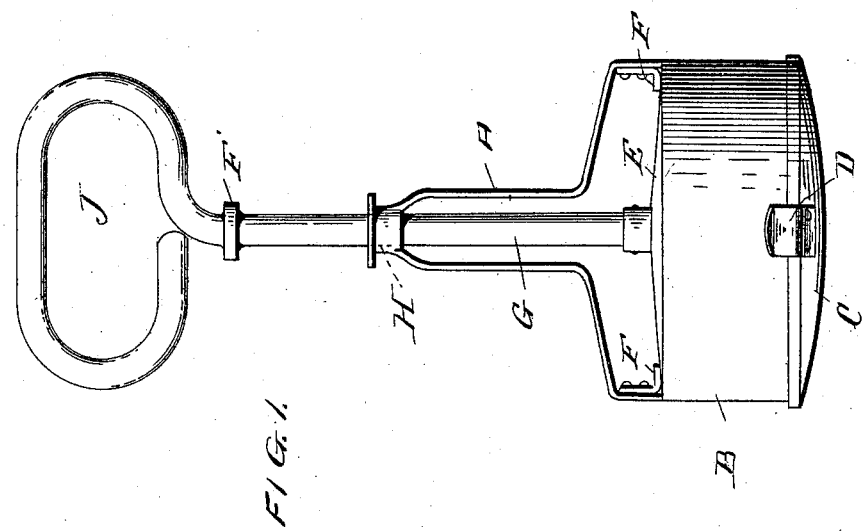
WITNESSES
INVENTOR
Antoinette P. Bodenstein

UNITED STATES PATENT OFFICE.

ANTOINETTE P. BODENSTEIN, OF STAATSBURG, NEW YORK.

FOOD-MOLDER.

996,449.  Specification of Letters Patent.  Patented June 27, 1911.

Application filed January 23, 1911. Serial No. 604,208.

*To all whom it may concern:*

Be it known that I, ANTOINETTE P. BODENSTEIN, a citizen of the United States, residing at Staatsburg, in the county of Dutchess and State of New York, have invented certain new and useful Improvements in Food-Molders, of which the following is a specification.

My invention relates to improvements in food molders and the object of my invention is the provision of an article of this character which will be particularly useful in molding or forming croquettes, fish cakes, meat cakes or like food into forms or molds of equal size and shape and which will be of extremely simple and inexpensive construction, which will mold the food rapidly and of the desired shape.

To attain the desired object my invention consists of a food molder comprising a mold box or receptacle, a hinged bottom and a plunger to press the food into shape and to expel the molded form.

The invention also consists of a food molder embodying novel features of construction and combination of parts substantially as disclosed herein.

Figure 1 represents a side view of my device, and Fig. 2 represents a vertical sectional view.

My food molder consists of the bail or loop A having connected to its lower portion the band B, to which is hinged the bottom C, adapted to be retained in closed position by the spring catch D, and fitting in the band is the plunger or follower E, which is limited in its upward movement by the stops F, and to the plunger is secured the lower end of the rod G, which is guided by the opening H, of the bail and has on its upper end the finger loop J for operating the rod, and the rod is formed with a stop F' for limiting its vertical movement.

In use the food in plastic form is placed in the mold box formed by the band and the bottom is closed and pressure upon the rod forces the plunger against the food and molds the food to the desired form and when sufficiently compressed the bottom is released and the plunger moved down to expel the food in the form of a cake. The upward movement of the plunger is limited by the stop E, and the movement of the rod is regulated by the stop F'.

It is evident that by means of my device I can provide molded forms of food in a rapid manner and of the same size and shape and also that I can give any desired design or configuration to the molded form by making the necessary design on the plunger band and bottom forming the mold box, as whatever configuration is given to the mold box will be imparted to the molded food.

I claim:

1. In a food molder the combination with a mold box, of a bottom hinged to the mold box and having a catch thereon to hold the bottom in closed position, a plunger movable in said mold box and connected to a pressure rod, and an opening formed on the bail of the mold box to provide a guide for the said plunger rod.

2. The food mold herein shown and described, consisting of the band forming the mold box, the concaved bottom hinged at one side of the mold box, the spring catch carried by the bottom and engaging the mold box to retain the bottom in closed position, the bail rising from the mold box, the stops secured to the bail at the upper edge of the mold box, the plunger movable in the box and adapted to engage the stops in its upward movement, the plunger rod guided in the bail, and having a collar for engaging the bail and limiting the downward movement of the plunger rod.

In testimony whereof I affix my signature, in presence of two witnesses.

ANTOINETTE P. BODENSTEIN.

Witnesses:
 LOUISE A. BODENSTEIN,
 MARGARET BODENSTEIN.

Copies of this patent may be obtained for five cents each, by addressing the "Commissioner of Patents, Washington, D. C."